United States Patent
Yang et al.

(10) Patent No.: US 9,344,905 B2
(45) Date of Patent: May 17, 2016

(54) METHOD AND TERMINAL FOR DETECTING PHICH IN WIRELESS ACCESS SYSTEM

(71) Applicant: LG Electronics Inc., Seoul (KR)

(72) Inventors: Yoonoh Yang, Anyang-si (KR); Suhwan Lim, Anyang-si (KR); Manyoung Jung, Anyang-si (KR); Sangwook Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 14 days.

(21) Appl. No.: 14/373,852

(22) PCT Filed: Jan. 30, 2013

(86) PCT No.: PCT/KR2013/000746
§ 371 (c)(1),
(2) Date: Jul. 22, 2014

(87) PCT Pub. No.: WO2013/115554
PCT Pub. Date: Aug. 8, 2013

(65) Prior Publication Data
US 2015/0029882 A1   Jan. 29, 2015

Related U.S. Application Data

(60) Provisional application No. 61/592,006, filed on Jan. 30, 2012, provisional application No. 61/609,953, filed on Mar. 13, 2012.

(51) Int. Cl.
*H04W 4/00* (2009.01)
*H04W 24/02* (2009.01)
(Continued)

(52) U.S. Cl.
CPC ........... *H04W 24/02* (2013.01); *H04J 11/0056* (2013.01); *H04L 1/1692* (2013.01); *H04L 5/005* (2013.01); *H04L 27/2602* (2013.01); *H04W 4/06* (2013.01); *H04L 12/189* (2013.01)

(58) Field of Classification Search
None
See application file for complete search history.

(56) References Cited

U.S. PATENT DOCUMENTS

2010/0260057 A1    10/2010  Lee et al.
2011/0305179 A1*   12/2011  Wang .................... H04L 1/0031
                                                       370/311

(Continued)

FOREIGN PATENT DOCUMENTS

| KR | 10-2009-0064299 | 6/2009 |
| KR | 10-2009-0089780 | 8/2009 |
| KR | 10-2011-0119551 | 11/2011 |
| WO | 2010-006285 | 1/2010 |
| WO | 2011-0122833 | 10/2011 |

*Primary Examiner* — Kevin C Harper
(74) *Attorney, Agent, or Firm* — Dentons US LLP

(57) ABSTRACT

The present invention relates to a method and terminal for detecting a physical hybrid-ARQ indicator channel (PHICH) in a wireless access system that supports enhanced inter-cell interference coordination. In particular, the method includes: determining whether the PHICH exists in only a $0^{th}$ orthogonal frequency division multiplexing (OFDM) symbol if a subframe transmitted by a neighboring base station is an almost blanked subframe (ABS); determining whether a common reference signal (CRS) of the neighboring base station collides with a CRS of a serving base station if the PHICH exists outside of the $0^{th}$ OFDM symbol; determining whether CRS power of the neighboring base station does not collide with the CRS of the serving base station; and determining whether an acknowledgement/negative-acknowledgement (ACK/Negative-ACK) is detected by replacing a symbol of the PHICH, overlapped with the CRS power of the neighboring base station is greater than the preset threshold.

12 Claims, 12 Drawing Sheets

(51) Int. Cl.
*H04L 1/16* (2006.01)
*H04J 11/00* (2006.01)
*H04L 5/00* (2006.01)
*H04L 27/26* (2006.01)
*H04W 4/06* (2009.01)
*H04L 12/18* (2006.01)

(56) References Cited

U.S. PATENT DOCUMENTS

2012/0113844 A1* 5/2012 Krishnamurthy ..... H04L 1/0026
370/252
2015/0071183 A1* 3/2015 Bontu ................... H04L 1/1861
370/329

* cited by examiner

METHOD AND TERMINAL FOR DETECTING PHICH IN WIRELESS ACCESS SYSTEM

This application is a 35 USC §371 National Stage entry of International Application No. PCT/KR2013/000746 filed on Jan. 30, 2013 and claims priority to U.S. Provisional Application No. 61/592,006, filed Jan. 30, 2012, and U.S. Provisional Application No. 61/609,953, filed Mar. 13, 2012 all of which are incorporated by reference in their entirety herein.

TECHNICAL FIELD

The present invention relates to a wireless access system, and more particularly, to a method of detecting PHICH (physical hybrid-ARQ indicator channel) in a wireless access system supporting enhanced inter-cell interference coordination and an apparatus therefor.

BACKGROUND ART

A mobile communication system has been developed to provide an audio service to a user while securing mobility of the user. Yet, the mobile communication system is gradually expanding its service area not only the audio service but also a data service and has developed to the extent as much as providing fast data service nowadays. Yet, since the currently providing mobile communication system is experiencing a lack of resources and users are requiring a faster service, a more advanced mobile communication system is required.

One of most important things of a next generation wireless access system is to satisfy data transfer rate demand. To this end, ongoing effort to develop various technologies including MIMO (multiple input multiple output), CoMP (cooperative multiple point transmission), a relay and the like is in progress.

In addition, application of a heterogeneous network consisting of a macro-pico or a macro-femto is expanding to accept rapidly increasing wireless data demand. In this case, a pico cell or a femto cell is positioned within a macro cell. In this circumstance, a user equipment positioned at a cell boundary of duplicated cells may receive signals from each of the cells and the signals act like interference with each other.

DISCLOSURE OF THE INVENTION

Technical Task

A technical task of the present invention is to provide a method for a user equipment to efficiently detect ACK/NACK (acknowledgement/Negative-ACK) of PHICH and an apparatus therefor when the PHICH exists in a manner of lying over many symbols in a wireless access system, preferably in a wireless access system supporting enhanced inter-cell interference coordination.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of detecting a PHICH (physical hybrid-ARQ indicator channel) of a serving base station in a wireless access system supporting eICIC (enhanced inter-cell interference coordination) includes if a subframe transmitted by a neighboring base station corresponds to an ABS (almost blanked subframe), determining whether the PHICH exists in a $0^{th}$ OFDM (orthogonal frequency division multiplexing) symbol only, if the PHICH does not exist in the $0^{th}$ OFDM symbol only, determining whether a CRS (common reference signal) of the neighboring base station collides with a CRS of the serving base station, if the CRS of the neighboring base station does not collide with the CRS of the serving base station, determining whether CRS power of the neighboring base station is greater than a predetermined threshold and if the CRS power of the neighboring base station is greater than the predetermined threshold, determining ACK/NACK (acknowledgement/negative-ACK) detection in a manner of replacing symbols of the PHICH duplicated with the CRS of the neighboring base station with 0 and then adding up the symbols of the PHICH.

To further achieve these and other advantages and in accordance with the purpose of the present invention, according to a different embodiment, a user equipment detecting a PHICH (physical hybrid-ARQ indicator channel) of a serving base station in a wireless access system supporting eICIC (enhanced inter-cell interference coordination) includes an RF (radio frequency) unit configured to transmit/receive a radio signal and a processor, if a subframe transmitted by a neighboring base station corresponds to an ABS (almost blanked subframe), the processor configured to determine whether the PHICH exists in a $0^{th}$ OFDM (orthogonal frequency division multiplexing) symbol only, if the PHICH does not exist in the $0^{th}$ OFDM symbol only, the processor configured to determine whether a CRS (common reference signal) of the neighboring base station collides with a CRS of the serving base station, if the CRS of the neighboring base station does not collide with the CRS of the serving base station, the processor configured to determine whether CRS power of the neighboring base station is greater than a predetermined threshold, if the CRS power of the neighboring base station is greater than the predetermined threshold, the processor configured to determine ACK/NACK (acknowledgement/negative-ACK) detection in a manner of replacing symbols of the PHICH duplicated with the CRS of the neighboring base station with 0 and then adding up the symbols of the PHICH.

Preferably, if the PHICH exists in the $0^{th}$ OFDM symbol only, it is able to determine the ACK/NACK detection in a manner of adding up all of the symbols of the PHICH.

Preferably, if the CRS of the neighboring base station collides with the CRS of the serving base station, it is able to determine the ACK/NACK detection in a manner of adding up all of the symbols of the PHICH.

Preferably, if the CRS power of the neighboring base station is not greater than the predetermined threshold, it is able to determine the ACK/NACK detection in a manner of adding up all of the symbols of the PHICH.

Preferably, the threshold can be determined based on a relative value of the CRS power of the neighboring base station and the CRS power of the serving base station.

Preferably, the subframe transmitted by the neighboring base station may correspond to an MBSFN (multicast broadcast single frequency network) subframe.

Advantageous Effects

According to embodiment of the present invention, a user equipment can efficiently detect ACK/NACK (acknowledgement/Negative-ACK) of PHICH in case that the PHICH exists in a manner of lying over many symbols in a wireless access system, preferably in a wireless access system supporting enhanced inter-cell interference coordination.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
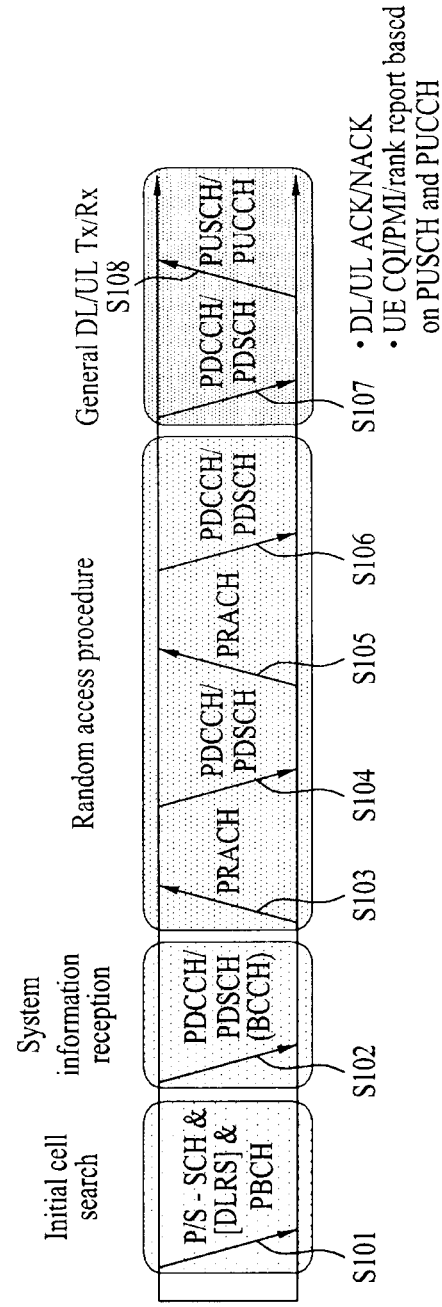
FIG. 1 is a diagram for explaining physical channels used for 3GPP LTE system and a general signal transmission method using the physical channels.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices.

In this specification, embodiments of the present invention are described centering on the data transmission/reception relations between a base station and a user equipment. In this case, the base station has a meaning of a terminal node of a network directly communicating with a user equipment. In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other network nodes except the base station. 'Base station (BS)' may be substituted with such a terminology as a fixed station, a Node B, an eNode B (eNB), an access point (AP) and the like. A relay may be substituted with such a terminology as a relay node (RN), a relay station (RS), and the like. And, 'terminal' may be substituted with such a terminology as a user equipment (UE), an MS (mobile station), an MSS (mobile subscriber station), an SS (subscriber station), an AMS (advanced mobile station, a WT (wireless terminal), an MTC (machine-type communication) device, an M2M (machine-to-machine) device, a D2D (device-to-device) device or the like.

Specific terminologies used in the following description are provided to help understand the present invention and the use of the specific terminologies can be modified into a different form in a range of not deviating from the technical idea of the present invention.

Embodiments of the present invention may be supported by the standard documents disclosed in at least one of wireless access systems including IEEE 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may be usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3$^{rd}$ Generation Partnership Project) LTE (long term evolution) is a part of E-UMTS (Evolved UMTS) that uses E-UTRA. The 3GPP LTE adopts OFDMA in downlink (hereinafter abbreviated DL) and SC-FDMA in uplink (hereinafter abbreviated UL). And, LTE-A (LTE-Advanced) is an evolved version of 3GPP LTE.

For clarity, the present invention mainly concerns 3GPP LTE/LTE-A, by which the technical characteristic of the present invention may be non-limited.

1. 3GPP LTE/LTE-A System to which the Present Invention is Applicable 1. 1. The General of System FIG. 1 is a diagram for explaining physical channels used for 3GPP system and a general signal transmission method using the same.

Referring to FIG. 1, if a power of a user equipment is turned on or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the base station, may match synchronization with the base station and may then obtain information such as a cell ID and the like.

Subsequently, the user equipment may receive a physical broadcast channel from the base station and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain more detailed system information [S102].

Subsequently, the user equipment may be able to perform a random access procedure to complete the access to the base station [S103 to S106]. To this end, the user equipment may transmit a preamble via a physical random access channel (PRACH) [S103] and may be then able to receive a response message via PDCCH and a corresponding PDSCH in response to the random access [S104]. In case of a contention based random access, it may be able to perform a contention resolution procedure such as a transmission S105 of an additional physical random access channel and a channel reception S106 of a physical downlink control channel and a corresponding physical downlink shared channel.

Having performed the above mentioned procedures, the user equipment may be able to perform a PDCCH/PDSCH reception S107 and a PUSCH/PUCCH (physical uplink shared channel/physical uplink control channel) transmission S108 as a general uplink/downlink signal transmission procedure.

Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) information and the like.

In LTE system, the UCI is normally transmitted via PUCCH by periods. Yet, in case that both control information and traffic data need to be simultaneously transmitted, the UCI may be transmitted on PUSCH. Moreover, the UCI may be non-periodically transmitted in response to a request/indication made by a network.

Figure 2:
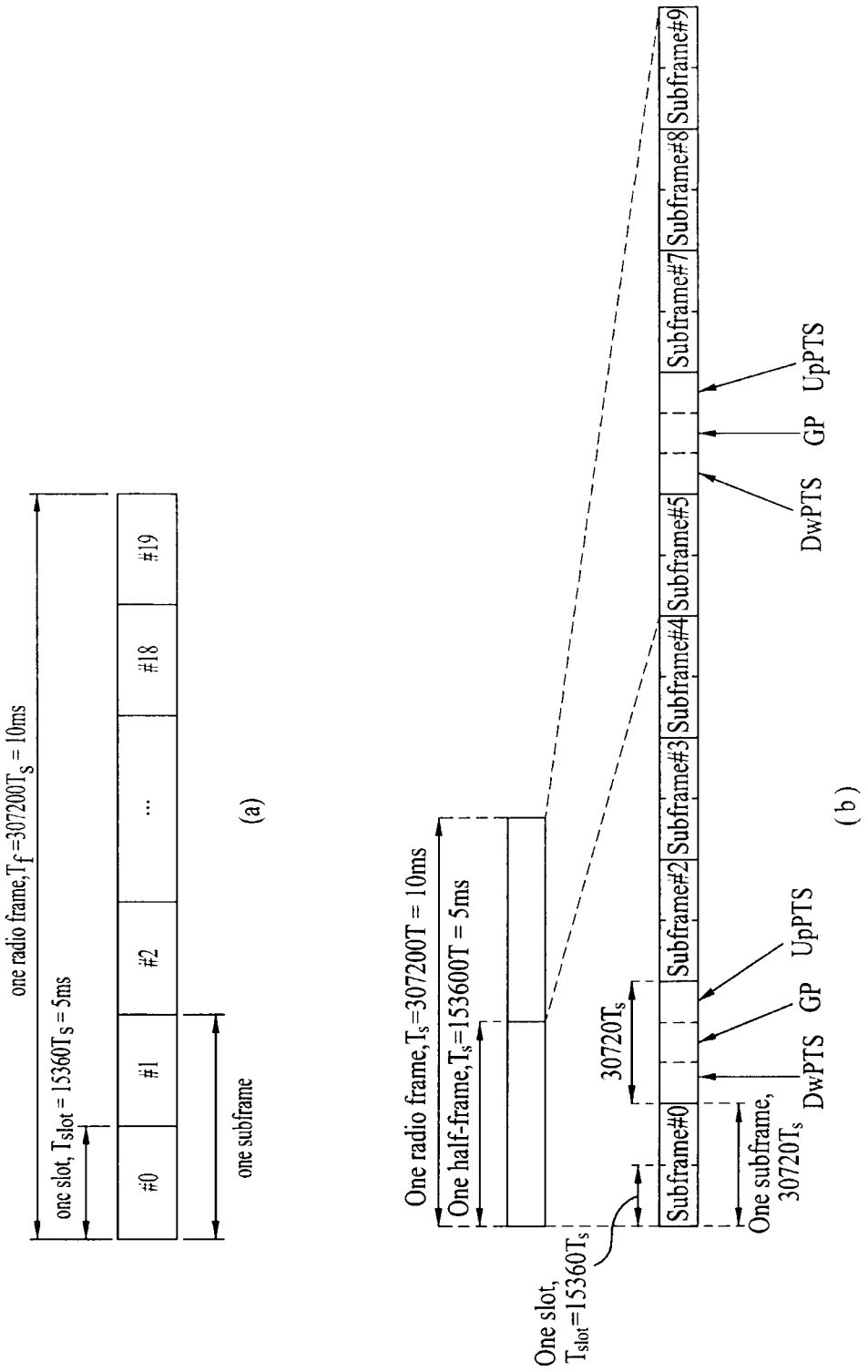
FIG. 2 is a diagram for a structure of a radio frame in 3GPP LTE system.

FIG. 2 shows structures of radio frames in 3GPP LTE.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type 1 radio frame structure applicable to FDD (frequency division duplex) and a type 2 radio frame structure applicable to TDD (time division duplex) are supported.

FIG. 2(a) is a diagram for a structure of a type 1 radio frame. A DL (downlink) radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDMA in downlink, OFDM symbol is provided to indicate one symbol interval. The OFDM symbol may be named SC-FDMA symbol or symbol interval. Resource block (RB) is a resource allocation unit and may include a plurality of contiguous subcarriers in one slot.

The number of OFDM symbols included in one slot may vary in accordance with a configuration of CP (cyclic prefix). The CP may be categorized into an extended CP and a normal CP. For instance, in case that OFDM symbols are configured by the normal CP, the number of OFDM symbols included in one slot may correspond to 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may correspond to 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 3 OFDM symbols of each subframe may be allocated to PDCCH (physical downlink control channel), while the rest of the OFDM symbols are allocated to PDSCH (physical downlink shared channel).

FIG. 2(b) is a diagram for a structure of a downlink radio frame of type 2. A type 2 radio frame includes 2 half frames. Each of the half frame includes 5 subframes, a DwPTS (downlink pilot time slot), a GP (guard period), and an UpPTS (uplink pilot time slot). Each of the subframes includes 2 slots. The DwPTS is used for initial cell search, synchronization, or channel estimation in a user equipment. The UpPTS is used for channel estimation in a base station and matching a uplink transmission synchronization of a user equipment. The guard period is a period for eliminating interference generated in uplink due to multi-path delay of a downlink signal between uplink and downlink.

The above-described structures of the radio frame are exemplary only. And, the number of subframes included in a radio frame, the number of slots included in the subframe and the number of symbols included in the slot may be modified in various ways.

Figure 3:
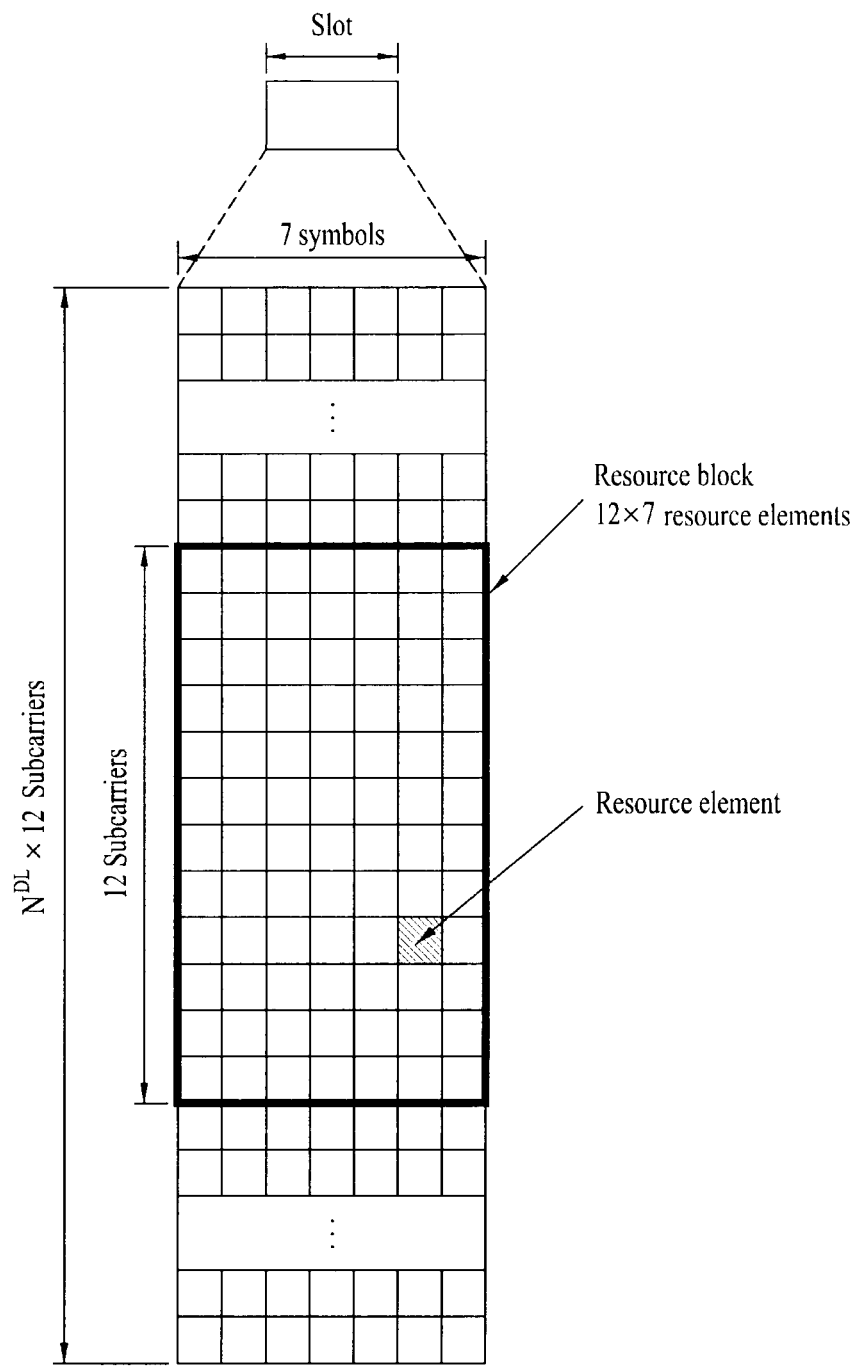
FIG. 3 is a diagram for an example of a resource grid for one downlink slot.

FIG. 3 is a diagram for an example of a resource grid for one downlink slot.

Referring to FIG. 3, one downlink slot includes a plurality of OFDM symbols in time domain. In this case, one downlink (DL) slot includes 7 OFDM symbols and one resource block (RB) includes 12 subcarriers in frequency domain, by which the present invention may be non-limited.

Each element on a resource grid is called a resource element. One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 4:
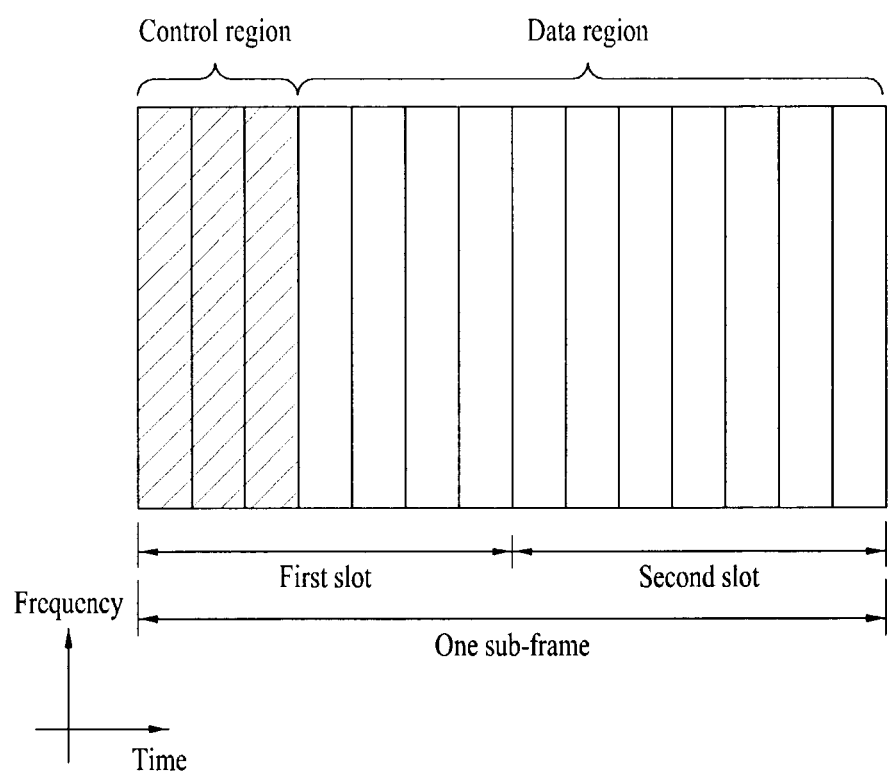
FIG. 4 is a diagram for a structure of a downlink subframe.

FIG. 4 is a diagram for a structure of a downlink subframe.

Referring to FIG. 4, Maximum 3 OFDM symbols situated in a head part of a first slot of one subframe correspond to a control region to which control channels are assigned. The rest of OFDM symbols correspond to a data region to which PDSCH (physical downlink shared channel) is assigned. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like.

The PCFICH is transmitted in a first OFDM symbol of a subframe and carries information on the number of OFDM symbols (i.e., a size of a control region) used for a transmission of control channels within the subframe. The PHICH is a response channel in response to UL transmission and carries ACK (acknowledgement)/NACK (not-acknowledgement) signals for a HARQ (hybrid automatic repeat request). Control information carried on PDCCH may be called downlink control information (hereinafter abbreviated DCI). The DCI may include UL resource allocation information, DL resource allocation information or a UL transmit power control command for a random UE (user equipment) group.

Figure 5:
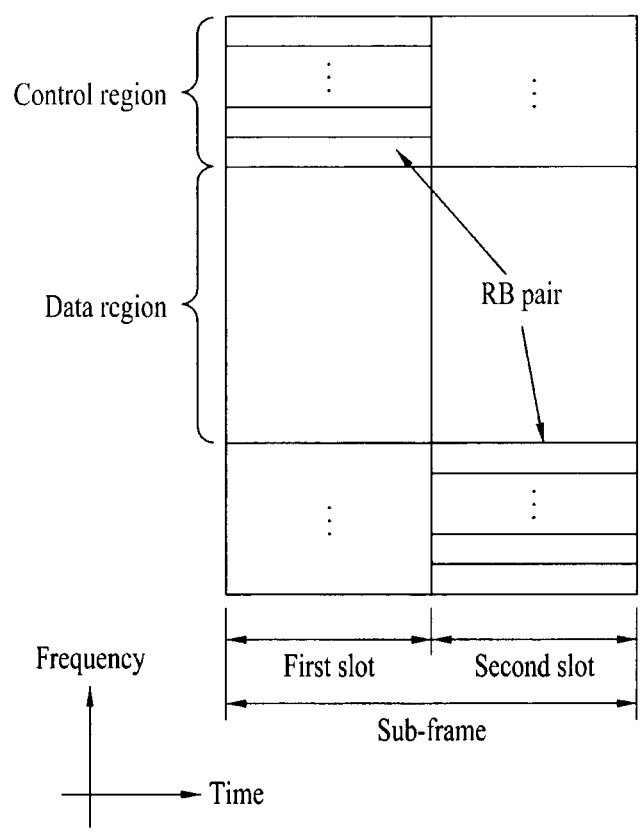
FIG. 5 is a diagram for a structure of an uplink subframe.

FIG. 5 is a diagram for a structure of an uplink subframe.

Referring to FIG. 5, a UL subframe may be divided into a control region and a data region in frequency domain. A physical UL control channel (PUCCH), which carries UL control information, is assigned to the control region. And, a physical UL shared channel (PUSCH), which carries user data, is assigned to the data region. In order to maintain single carrier property, one user equipment does not transmit PUCCH and PUSCH simultaneously. PUCCH for one user equipment is assigned to a resource block pair (RB pair) in a subframe. Resource blocks belonging to the resource block (RB) pair may occupy different subcarriers in each of 2 slots. Namely, a resource block pair allocated to PUCCH is frequency-hopped on a slot boundary.

1. 2. eICIC (Enhanced Inter-Cell Interference Coordination)

A heterogeneous network/deployments indicates a structure in which a micro cell used for performing low power/short range communication coexists in a macro cell based-homogeneous network. The micro cell can be called a pico cell, a femto cell, a HeNB (Home evolved Node B), a relay, or the like. For clarity, it is commonly called the micro cell in the following description.

The macro cell (or macro base station) has a wide coverage and high transmit power and means a general cell (or base station) of a wireless communication system. And, the micro cell (or micro base station) is a small version of the macro cell. The micro cell can independently operate while performing most of functions of the macro cell. The micro cell indicates a cell (or base station) capable of being installed (overlay) in a region covered by the macro cell or capable of being installed (non-overlay) in a radio shadow area not covered by the macro cell. The micro cell has a narrow coverage and low transmit power and may accept a less number of user equipments compared to the macro cell.

A user equipment may directly receive a service from the macro cell or may receive a service from the micro cell. In some cases, a user equipment existing in the coverage of the micro cell may receive a service from the macro cell.

According to whether an access of a user equipment is restricted, the micro cell can be classified into two types. A first type corresponds to a CSG (closed subscriber group) cell. The CSG cell indicates a cell not permitting an access of a legacy macro UE (a UE receiving service from the macro cell) or different micro UEs (UEs receiving service from the micro cell) without authentication. A second type corresponds to an OASC (open access subscriber group) or an OSC (open subscriber group) cell. The OASC or OSC cell indicates a cell permitting the access of the legacy macro UE or the different micro UEs.

In a heterogeneous network environment in which the macro cell and the micro cell coexist, serious inter-cell interference may occur compared to a homogeneous network environment in which the macro cell (or the micro cell) exists only. In particular, in case of a UE positioned at a cell boundary of cells duplicated in the heterogeneous network environment, signals transmitted from each of the cells act as interference with each other. Hence, measurement accuracy of RSRP (reference signal received power)/RSRQ (reference signal received quality), which is essential in managing a radio resource, may be considerably deteriorated.

Hence, ongoing effort and research on eICIC (enhanced inter-cell interference coordination) are actively performed in a recent 3GPP LTE-A system as one of methods of inter-cell interference coordination. An interfering cell is called an aggressor cell or a primary cell and an interfered cell is called a victim cell or a secondary cell. A UE can maintain an access with the victim cell or the secondary cell in a specific subframe in a manner that the aggressor cell or the primary cell stops transmitting data in the specific subframe. In particular, according to the aforementioned method, in case that the macro cell and the micro cell coexist, an interference signal is hardly transmitted to a user equipment, which is considerably interfered in a prescribed area, in a manner that a base station in one side temporarily stops transmitting a signal to the user equipment.

The macro cell may become the aggressor cell or the primary cell and the micro cell may become the victim cell or the secondary cell. On the contrary, the micro cell may become the aggressor cell or the primary cell and the macro cell may become the victim cell or the secondary cell.

In LTE-A system to which the eICIC is applied, a separate subframe is not applied for the compatibility with a UE of a legacy LTE system. Instead, a subframe to which data is not allocated except a minimum signal essential for an operation of a UE is used in a manner of including a CRS (common reference signal). In particular, the macro cell uses a subframe called an ABS (almost blank subframe) (or ABSF) and a downlink control channel and a data channel are not transmitted in the ABS except the CRS. By doing so, the UE receiving a service from the micro cell, in particular, the UE positioned at the cell boundary of the duplicated cells can be protected from strong interference originated from the macro cell. And, if the ABS is matched with an MBSFN (multicast broadcast single frequency network) subframe, the CRS is not transmitted in a data region of the ABS. In particular, in case of the MBSFN ABS subframe, interference between CRSs can be excluded from 4, 7 and 11 OFDM symbol period including remaining CRS except a first CRS in a manner of eliminating the remaining CRS except the first CRS (the CRS transmitted in $0^{th}$ OFDM symbol).

In the eICIC situation, it is able to know a subframe form of each base station by exchanging a signal with each other between a macro cell and a pico cell via an X2 interface connection. For instance, the macro cell or the pico cell exchanges information on the MBSFN subframe and information on a subframe operating as the ABS via an X2 interface based-signaling.

On the contrary, since the X2 interface does not exist between the macro cell and the femto cell, a predefined ABS pattern is applied to the femto cell by a configuration of OAM (operation, administration and maintenance). For instance, in order to obtain information on the MBSFN subframe of the macro cell, the femto cell obtains the MBSFN subframe information in a manner of receiving system information broadcasted from the macro cell in wireless. Or, the femto cell may obtain the MBSFN subframe information of the macro cell from a control base station of a core network.

Figure 6:
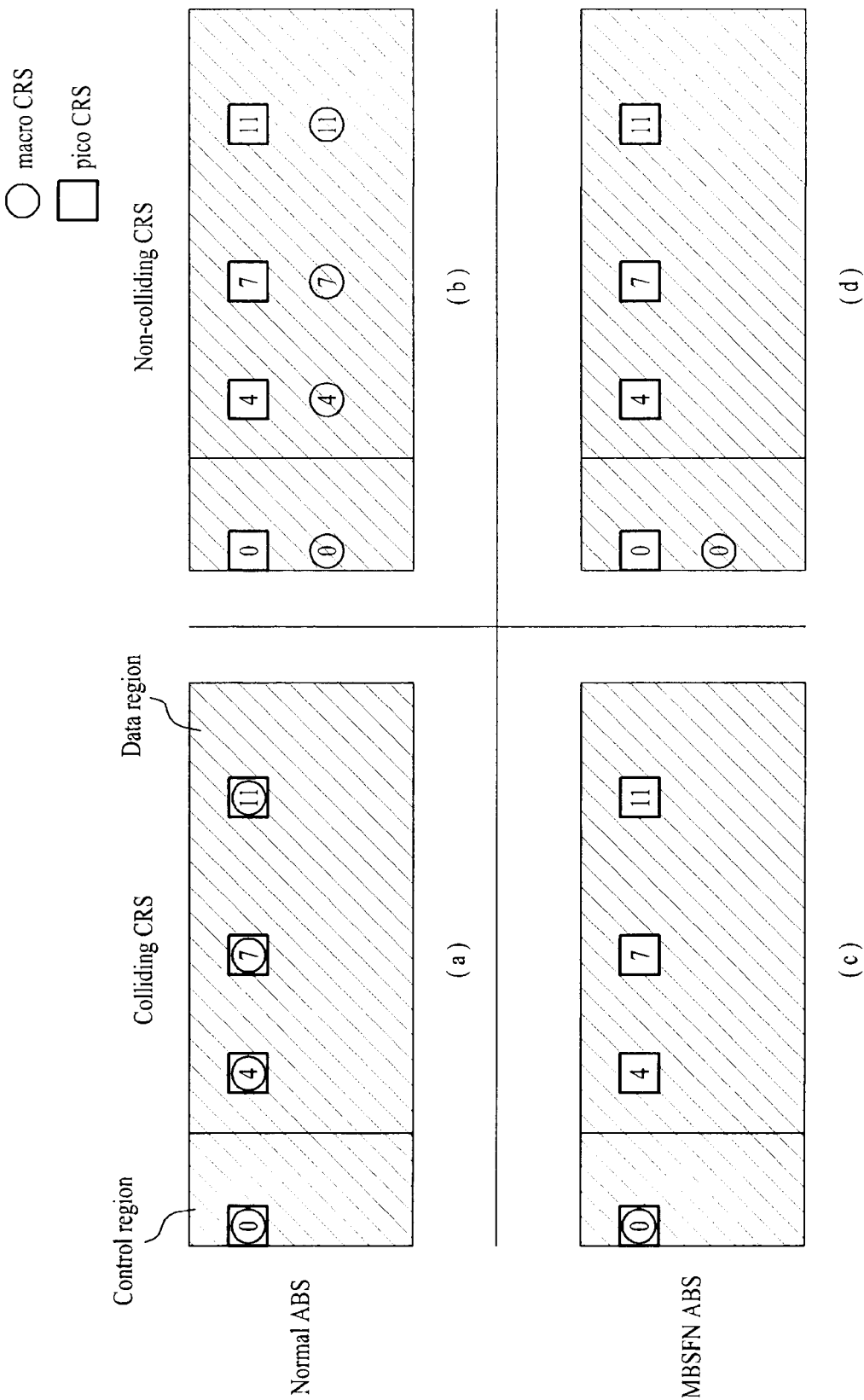
FIG. 6 is a diagram for an example of an ABS pattern of a macro cell and a pico cell in a system to which eICIC is applied.

FIG. 6 is a diagram for an example of an ABS pattern of a macro cell and a pico cell in a system to which eICIC is applied.

Referring to FIG. 6, when the eICIC is applied, 4 cases may exist in general according to a signal transmission pattern between two base stations.

FIG. 6(a) shows a case of a normal ABS with a colliding CRS. In particular, when a subframe form of a macro cell and a subframe form of a pico cell correspond to a normal subframe, all of CRS positions of the macro cell are identical to all of CRS positions of the pico cell. In this case, the CRSs collide with each other and act as interference to each other, thereby considerably deteriorating transmission performance of a signal.

FIG. 6(b) shows a case of a normal ABS with non-colliding CRS. In particular, when the subframe form of the macro cell and the subframe form of the pico cell correspond to a normal subframe, all of CRS positions of the macro cell are different from all of CRS positions of the pico cell. Hence, interference influence between CRSs does not exist.

FIG. 6(c) shows a case of an MBSFN ABS with colliding CRS where a colliding CRS exists. In particular, when the subframe form of the macro cell corresponds to an MBSFN subframe and the subframe form of the pico cell corresponds to a normal subframe, a position of a CRS, which is transmitted in $0^{th}$ symbol, is identical to each other. Since the subframe form of the macro cell corresponds to the MBSFN subframe, CRS of the macro cell does not exist in $4^{th}$, $7^{th}$ and $11^{th}$ symbol. Yet, since the CRS transmitted via the $0^{th}$ symbol is collided with each other, it may act as interference with each other.

FIG. 6(d) shows a case of an MBSFN with non-colliding CRS where a colliding CRS does not exist. In particular, when the subframe form of the macro cell corresponds to an MBSFN subframe and the subframe form of the pico cell corresponds to a normal subframe, a position of a CRS, which is transmitted in $0^{th}$ symbol, is different from each other. Since the subframe form of the macro cell corresponds to the MBSFN subframe, CRS of the macro cell does not exist in $4^{th}$, $7^{th}$ and $11^{th}$ symbol. Since positions of the CRSs transmitted via the $0^{th}$ symbol are different from each other, interference influence between the CRSs does not exist.

In case that the eICIC is not applied, although a random cell among neighboring cells transmits a subframe configured as an MBSFN, a UE performs RSRP/RSRQ measurement using all CRSs irrespective of whether there exists interference of a CRS with a neighboring cell since all CRSs are transmitted in the subframe. On the contrary, in case that the eICIC is applied in LTE/LTE-A system, if a neighboring cell is configured as MBSFN, since a CRS is transmitted in a first OFDM symbol of each subframe in the MBSFN subframe of the neighboring cell, the UE should measure the RSRP/RSRQ using a first CRS of each slot only in case of measuring the RSRP/RSRQ.

1. 3. PHICH (Physical Hybrid-ARQ Indicator Channel)

A PHICH is a channel transmitting ACK/NACK information on an uplink data channel. A plurality of PHICHs form one PHICH group and map to an identical REG. PHICHs in the PHICH group can be classified by sequences different from each other. For instance, sequences orthogonal to each other can be used to classify the PHICHs. One PHICH group includes PHICHs for a plurality of user equipments. A plurality of PHICH groups can be included in one subframe. For instance, the ACK/NACK information transmitted on the PHICH may form 12 symbols in a manner of being repeated 3 times and spread 4 times. In this case, 3 REGs can be used to transmit the PHICH.

A PHICH resource is identified by an index pair ($n_{PHICH}^{group}$, $n_{PHICH}^{seq}$). In this case, $n_{PHICH}^{group}$ indicates a PHICH group number and $n_{PHICH}^{seq}$ indicates an orthogonal sequence index in the PHICH group. $n_{PHICH}^{group}$ and $n_{PHICH}^{seq}$ are allocated using a lowest PRB index among PRB (physical resource block) indexes allocated for PUSCH transmission and cyclic shift of a demodulation reference signal transmitted by an uplink grant. $n_{PHICH}^{group}$ and $n_{PHICH}^{seq}$ can be obtained by Formula 1 in the following.

$$n_{PHICH}^{group} = (I_{PRB\_RA}^{lowest\_index} + n_{DMRS}) \bmod N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH}$$

[Formula 1]

In Formula 1, $n_{DMRS}$ is mapped from a cyclic shift value of a DMRS which is used for uplink transmission related to PHICH. $N_{SF}^{PHICH}$ indicates a spreading factor size used for PHICH modulation. $I_{PRB\_RA}^{lowest\_index}$ indicates a lowest PRB index among the uplink resource allocated PRB indexes. $N_{PHICH}^{group}$ indicates the number of PHICH group.

In case of a FDD frame (frame structure type 1), the number of PHICH group $N_{PHICH}^{group}$ is constant in all subframes and the number of PHICH group in one subframe can be obtained by Formula 2 in the following.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases}$$

[Formula 2]

In Formula 2, $N_g \in \{1/6, 1/2, 1, 2\}$ is provided by an upper layer. $n_{PHICH}^{group}$ index has a range ranging from 0 to $N_{PHICH}^{group} - 1$. $N_{RB}^{DL}$ indicates the number of resource block (RB) in a downlink band.

In case of a TDD frame (frame structure type 2), the number of PHICH group may vary according to every downlink subframe and can be represented as $m_i \cdot N_{PHICH}^{group}$. In this case, $m_i$ is given as shown in Table 1 in the following and $N_{PHICH}^{group}$ can be obtained by Formula 2. $n_{PHICH}^{group}$ index within a downlink subframe including non-zero PHICH resources has a range ranging from 0 to $m_i \cdot N_{PHICH}^{group} - 1$.

Table 1 shows $m_i$ in case of the frame structure type 2.

TABLE 1

| Uplink-downlink configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | — | — | — | 2 | 1 | — | — | — |
| 1 | 0 | 1 | — | — | 1 | 0 | 1 | — | — | 1 |
| 2 | 0 | 0 | — | 1 | 0 | 0 | 0 | — | 1 | 0 |
| 3 | 1 | 0 | — | — | — | 0 | 0 | 0 | 1 | 1 |
| 4 | 0 | 0 | — | — | 0 | 0 | 0 | 0 | 1 | 1 |
| 5 | 0 | 0 | — | 0 | 0 | 0 | 0 | 0 | 1 | 0 |
| 6 | 1 | 1 | — | — | — | 1 | 1 | — | — | 1 |

Figure 7:
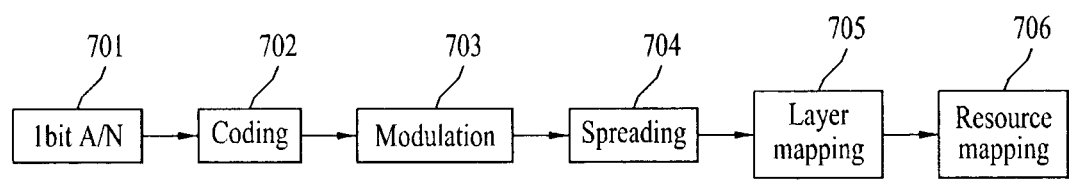
FIG. 7 is a diagram for an example of PHICH signal processing process/block.

FIG. 7 is a diagram for an example of PHICH signal processing process/block.

Referring to FIG. 7, a PHICH processing includes ACK/NACK (A/N) generation 701, (channel) coding 702, modulation 703, spreading 704, layer mapping 705 and resource mapping 706.

An ACK/NACK generation block 701 generates 1-bit ACK/NACK according to a decoding result of PUSCH (corresponding to a data stream, a code word, or a transmission block) received from a user equipment. In the following, the 1-bit ACK/NACK outputted from the ACK/NACK generation block 701 is called a HARQ indicator (HI).

Figure 8:
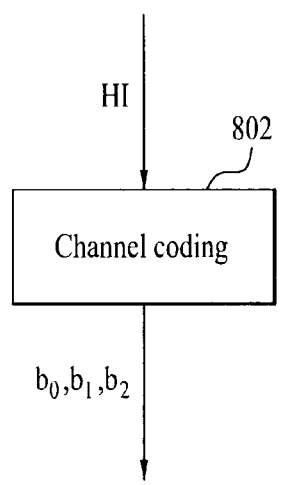
FIG. 8 is a diagram for an example of a channel coding block for HI.

FIG. 8 is a diagram for an example of a channel coding block for HI.

Referring to FIG. 7 and FIG. 8, a coding block 702/802 generates 3-bit HI code word (b0, b1 and b2) using a repetition coding where a code rate corresponds to 1/3 from 1-bit HI. 'HI=1' indicates a positive acknowledgement and 'HI=0' indicates a negative acknowledgement. Yet, it may be able to define it in reverse way.

Table 2 shows a relation between an HI and an HI code word in LTE/LTE-A system.

TABLE 2

| HI | HI code word <$b_0, b_1, b_2$> |
|---|---|
| 0 | <0, 0, 0> |
| 1 | <1, 1, 1> |

Subsequently, the modulation block 703 modulates bit block $b(0), \ldots, b(M_{bit}-1)$ (i.e., HI code word) transmitted on one PHICH to a modulation symbol block $z(0), \ldots, z(M_s-1)$. In this case, it may represent as $M_s = M_{bit}$.

Table 3 shows a modulation mapping applicable to PHICH.

TABLE 3

| Physical channel | Modulation schemes |
|---|---|
| PHICH | BPSK |

As shown in Table 3, PHICH is modulated into BPSK (binary phase shift keying) in LTE/LTE-A system.

The spreading block 704 spreads the modulation symbol block $z(0), \ldots, z(M_s-1)$ out in a manner of multiplying the modulation symbol block by an orthogonal sequence in symbol-wise and generates a modulation symbol sequence $d(0), \ldots, d(M_{symb}-1)$ by applying scrambling to the spread modulation symbol block.

Formula 3 shows an example of processing the spreading block 704.

$$d(i) = w(i \bmod N_{SF}^{PHICH}) \cdot (1 - 2c(i)) \cdot z(\lfloor i/N_{SF}^{PHICH} \rfloor) \quad \{\text{Formula 3}\}$$

In this case, it may represent as $$N_{SF}^{PHICH} = \begin{cases} 4 & \text{normal cyclic prefix} \\ 2 & \text{extended cyclic prefix} \end{cases}$$

and $c(i)$ indicates a cell-specific scrambling sequence. A scrambling sequence generator can be initialized to $c_{init} = (\lfloor n_s/2 \rfloor + 1) \cdot (2N_{ID}^{cell} + 1) \cdot 2^9 + N_{ID}^{cell}$ in every subframe. In this case, $n_s$ indicates a subframe index and $N_{ID}^{cell}$ indicates a cell identifier.

A sequence $[w(0) \ldots w(N_{SF}^{PHICH}-1)]$ indicates an orthogonal sequence for PHICH and a sequence index $n_{PHICH}^{seq}$ corresponds to a PHICH number within a PHICH group.

Table 4 shows an orthogonal sequence (spreading sequence) for PHICH.

TABLE 4

| | Orthogonal sequence | |
|---|---|---|
| Sequence index $n_{PHICH}^{seq}$ | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

The layer mapping block 705 performs resource group arrangement, layer mapping and precoding.

First of all, the modulation symbol sequence $d(0), \ldots, d(M_{symb}-1)$ spread via the resource group arrangement is arranged by an REG (resource element group) unit and symbol block $d^{(0)}, \ldots, d^{(0)}(c \cdot M_{symb}-1)$ is consequently provided. In this case, in case of a normal CP, c corresponds to 1. And, in case of an extended CP, c corresponds to 2.

Formula 4 shows an example of a method of performing the resource group arrangement.

[Formula 4]

In case of a normal CP, $d^{(0)}(i) = d(i)$ ($i = 0, \ldots, M_{symb}-1$)

In case of an extended CP, $$[d^{(0)}(4i) \; d^{(0)}(4i+1) \; d^{(0)}(4i+2) \; d^{(0)}(4i+3)]^T =$$

$$\begin{cases} [d(2i) \; d(2i+1) \; 0 \; 0]^T & n_{PHICH}^{group} \bmod 2 = 0 \\ [0 \; 0 \; d(2i) \; d(2i+1)]^T & n_{PHICH}^{group} \bmod 2 = 1 \end{cases}$$

$$(i = 0, \ldots, (M_{symb}/2)-1)$$

Subsequently, the symbol block $d^{(0)}(0), \ldots, d^{(0)}(c \cdot M_{symb}-1)$ is converted to a vector block $y(i)[y^{(0)}(i) \ldots y^{(P-1)}(i)]^T$ ($i=0, \ldots, c \cdot M_{symb}-1$) in a manner of being passed by layer mapping and precoding. In this case, $y^{(p)}(i)$ indicates a signal for an antenna port $p(p=0, \ldots, P-1)$. In case of LTE/LTE-A system, the number of antenna port for a cell-specific reference signal corresponds to $P \in \{1, 2, 4\}$. The layer mapping and the precoding depend on a CP length and the number of antenna port used for PHICH transmission. PHICH can be transmitted via an antenna port identical to an antenna port set used for PBCH transmission.

In case of transmitting PHICH via a single antenna port (p=1), the layer mapping and the precoding are performed using Formula 5 and Formula 6, respectively.

$$x^{(0)}(i) = d^{(0)}(i) \quad [\text{Formula 5}]$$

$$y^{(p)}(i) = x^{(0)}(i) \quad [\text{Formula 6}]$$

In Formula 5 and Formula 6, it may be represented as $i=0, \ldots, c \cdot M_{symb}-1$ and $M_{symb}^{(0)} = c \cdot M_{symb}$.

In case of transmitting PHICH via two antenna ports (p=2), the layer mapping and the precoding are performed using Formula 7 and Formula 8, respectively.

$$x^{(0)}(i) = d^{(0)}(2i) \quad [\text{Formula 7}]$$
$$x^{(1)}(i) = d^{(0)}(2i+1)$$

$$\begin{bmatrix} y^{(0)}(2i) \\ y^{(1)}(2i) \\ y^{(0)}(2i+1) \\ y^{(1)}(2i+1) \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} \text{Re}(x^{(0)}(i)) \\ \text{Re}(x^{(1)}(i)) \\ \text{Im}(x^{(0)}(i)) \\ \text{Im}(x^{(1)}(i)) \end{bmatrix} \quad [\text{Formula 8}]$$

In Formula 7 and Formula 8, it may be represented as $i=0, 1, \ldots, M_{symb}^{layer}-1$, $M_{symb}^{layer} = M_{symb}^{(0)}/2$, $M_{symb}^{(0)} = c \cdot M_{symb}$. In case of a normal CP, c corresponds to 1, And, in case of an extended CP, c corresponds to 2.

In case of transmitting PHICH via four antenna ports (p=4), the layer mapping is performed using Formula 9.

$$x^{(0)}(i) = d^{(0)}(4i)$$

$$x^{(1)}(i) = d^{(0)}(4i+1)$$

$$x^{(2)}(i) = d^{(0)}(4i+2)$$

$$x^{(3)}(i) = d^{(0)}(4i+3) \quad [\text{Formula 9}]$$

In Formula 9, it may be represented as i=0, 1, ..., $M_{symb}^{layer}-1$, $$M_{symb}^{layer} = \begin{cases} M_{symb}^{(0)}/4 & \text{if } M_{symb}^{(0)} \bmod 4 = 0 \\ (M_{symb}^{(0)}+2)/4 & \text{if } M_{symb}^{(0)} \bmod 4 \neq 0 \end{cases} \quad [5]$$

and $M_{symb}^{(0)} = c \cdot M_{symb}$. In this case, if it satisfies $M_{symb}^{(0)} \bmod 4 \neq 0$, 2 null symbols are added to $d^{(0)}(M_{symb}^{(0)}-1)$. In case of a normal CP, c corresponds to 1, And, in case of an extended CP, c corresponds to 2.

And, In case of transmitting PHICH via four antenna ports (p=4), if it satisfies $(i+n_{PHICH}^{group}) \bmod 2=0$ in a normal CP or if it satisfies $(i+\lfloor n_{PHICH}^{group}/2 \rfloor) \bmod 2=0$ in an extended CP, the precoding is performed using Formula 10 in the following. Otherwise, the precoding is performed using Formula 11 in the following.

$$\begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \frac{1}{\sqrt{2}} \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \\ 0 & 0 & 0 & 0 & 0 & 0 & 0 & 0 \end{bmatrix} \begin{bmatrix} \text{Re}(x^{(0)}(i)) \\ \text{Re}(x^{(1)}(i)) \\ \text{Re}(x^{(2)}(i)) \\ \text{Re}(x^{(3)}(i)) \\ \text{Im}(x^{(0)}(i)) \\ \text{Im}(x^{(1)}(i)) \\ \text{Im}(x^{(2)}(i)) \\ \text{Im}(x^{(3)}(i)) \end{bmatrix}$$

[Formula 10]

$$\begin{bmatrix} y^{(0)}(4i) \\ y^{(1)}(4i) \\ y^{(2)}(4i) \\ y^{(3)}(4i) \\ y^{(0)}(4i+1) \\ y^{(1)}(4i+1) \\ y^{(2)}(4i+1) \\ y^{(3)}(4i+1) \\ y^{(0)}(4i+2) \\ y^{(1)}(4i+2) \\ y^{(2)}(4i+2) \\ y^{(3)}(4i+2) \\ y^{(0)}(4i+3) \\ y^{(1)}(4i+3) \\ y^{(2)}(4i+3) \\ y^{(3)}(4i+3) \end{bmatrix} = \frac{1}{\sqrt{2}} \begin{bmatrix} 0 & 0 & 0 & 0 & 0 & 0 & 0 & 0 \\ 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 0 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \end{bmatrix} \begin{bmatrix} \text{Re}(x^{(0)}(i)) \\ \text{Re}(x^{(1)}(i)) \\ \text{Re}(x^{(2)}(i)) \\ \text{Re}(x^{(3)}(i)) \\ \text{Im}(x^{(0)}(i)) \\ \text{Im}(x^{(1)}(i)) \\ \text{Im}(x^{(2)}(i)) \\ \text{Im}(x^{(3)}(i)) \end{bmatrix}$$

[Formula 11]

Subsequently, the resource mapping block 706 performs an operation for mapping the spread symbol sequence received from the layer mapping block 705 to a physical resource. A sequence $\bar{y}^{(p)}(n) = \Sigma y_i^{(p)}(n)$ for each PHICH group is defined as Formula 12 in the following.

$$\bar{y}^{(p)}(n) = \Sigma y_i^{(p)}(n) \quad [\text{Formula 12}]$$

In this case, summation is performed for all PHICHs within a PHICH group and $y_i^{(p)}(n)$ indicates a symbol sequence of an $i^{th}$ PHICH in the PHICH group. P corresponds to an antenna port.

The PHICH group is mapped to a PHICH mapping unit.

In case of a normal CP, a mapping between the PHICH group (m) and the PHICH mapping unit (m') is defined by Formula 13 in the following.

$$\tilde{y}_m^{(p)}(n) = \bar{y}_m^{(p)}(n) \quad [\text{Formula 13}]$$

In this case, it may be represented as $$m' = m = \begin{cases} 0, 1, \ldots, N_{PHICH}^{group} - 1 & \text{for frame structure type 1} \\ 0, 1, \ldots, m_i \cdot N_{PHICH}^{group} - 1 & \text{for frame structure type 2} \end{cases}.$$

$m_i$ is identical to an example of what is shown in Table 1.

In case of an extended CP, a mapping between the PHICH group (m and m+1) and the PHICH mapping unit (m') is defined by Formula 14 in the following.

$$\tilde{y}_m^{(p)}(n) = \bar{y}_m^{(p)}(n) + \bar{y}_{m+1}^{(p)}(n) \quad \text{[Formula 14]}$$

In this case, it may be represented as m'=m/2 and $$m = \begin{cases} 0, 2, \ldots, N_{PHICH}^{group} - 2 & \text{for frame structure type 1} \\ 0, 2, \ldots, m_i \cdot N_{PHICH}^{group} - 2 & \text{for frame structure type 2} \end{cases}.$$

$m_i$ is identical to an example of what is shown in Table 1.

A mapping of the PHICH mapping unit to a resource element is performed in a symbol quadruplet unit. For a resource mapping, $z^{(p)}(i) = \langle \tilde{y}^{(p)}(4i), \tilde{y}^{(p)}(4i+1), \tilde{y}^{(p)}(4i+2), \tilde{y}^{(p)}(4i+3) \rangle$ (i=0, 1, 2) is called a symbol quadruplet i for an antenna port p.

The mapping of the PHICH unit to the resource element is performed by 1 to 10 step as depicted in the following.

1) according to each l' value,
2) $n_r$ is defined by the number of resource element group (REG), which is allocated for PCFICH transmission within an OFDM symbol l',
3) the REGs allocated for the PCFICH transmission within the OFDM symbol l' are designated by numbers ranging from 0 to $n_r-1$ in a frequency ascending order starting from an REG including a lowest frequency domain index.
4) PHICH mapping unit number is initialized to m'=0.
5) According to a value i=0, 1, 2,
6) a symbol quadruplet $z^{(p)}(i)$ is mapped to an REG including $(k',l')_i$ in the PHICH mapping unit m'. In this case, an index pair (k',l') indicating the REG means an index pair of a resource element including a smallest index k among all resource elements within the REG including an identical l value. $k_i'$ value and $l_i'$ value can be obtained by following 7 and 8 step, respectively.
7) A time domain index $l_i'$ is determined by Formula 15.

$$l_i' = \begin{cases} 0 & \text{normal PHICH duration,} \\ & \text{all subframes} \\ (\lfloor m'/2 \rfloor + i + 1) \bmod 2 & \text{extended PHICH duration,} \\ & \text{MBSFN subframes} \\ (\lfloor m'/2 \rfloor + i + 1) \bmod 2 & \text{extended PHICH duration,} \\ & \text{subframe 1 and 6 in frame} \\ & \text{structure type 2} \\ i & \text{otherwise} \end{cases} \quad \text{[Formula 15]}$$

8) A frequency domain index $k_i'$ is configured for an REG in which a number $\bar{n}_i$ is designated in the aforementioned step 3. In this case, the $\bar{n}_i$ is determined by Formula 16 in the following in case that an extended PHICH duration is included in an MBSFN (multicast-broadcast single frequency network) subframe or the extended PHICH duration is included in a subframe 1 and 6 of a frame structure type 2. Otherwise, the $\bar{n}_i$ is determined by Formula 17 in the following.

$$\bar{n}_i = \begin{cases} (\lfloor N_{ID}^{cell} \cdot n_{l_i'}/n_1 \rfloor + m') \bmod n_{l_i'} & i = 0 \\ (\lfloor N_{ID}^{cell} \cdot n_{l_i'}/n_1 \rfloor + m' + \lfloor n_{l_i'}/3 \rfloor) \bmod n_{l_i'} & i = 1 \\ (\lfloor N_{ID}^{cell} \cdot n_{l_i'}/n_1 \rfloor + m' + \lfloor 2n_{l_i'}/3 \rfloor) \bmod n_{l_i'} & i = 2 \end{cases} \quad \text{[Formula 16]}$$

$$\bar{n}_i = \begin{cases} (\lfloor N_{ID}^{cell} \cdot n_{l_i'}/n_0 \rfloor + m') \bmod n_{l_i'} & i = 0 \\ (\lfloor N_{ID}^{cell} \cdot n_{l_i'}/n_0 \rfloor + m' + \lfloor n_{l_i'}/3 \rfloor) \bmod n_{l_i'} & i = 1 \\ (\lfloor N_{ID}^{cell} \cdot n_{l_i'}/n_0 \rfloor + m' + \lfloor 2n_{l_i'}/3 \rfloor) \bmod n_{l_i'} & i = 2 \end{cases} \quad \text{[Formula 17]}$$

In this case, the PHICH duration is configured by an upper layer according to Table 5 in the following.

Table 5 indicates the PHICH duration in an MBSFN and a non-MBSFN subframe.

TABLE 5

| | Non-MBSFN subframes | | MBSFN subframes |
|---|---|---|---|
| PHICH duration | Subframes 1 and 6 in case of frame structure type 2 | All other cases | on a carrier supporting PDSCH |
| Normal | 1 | 1 | 1 |
| Extended | 2 | 3 | 2 |

9) The PHICH mapping unit number m' is increased as much as 1.

10) Repeat from the step 5 until all PHICH mapping units are allocated.

1. 4. PHICH Demodulation

3GPP LTE/LTE-A system defines requirement for receiver characteristics and defines followings in relation to PHICH demodulation.

The receiver characteristics of PHICH is determined by probability (Pm-an) of miss-detecting, which is judging ACK information by NACK information in a receiver. In this case, assume that there is no bias, which is applied for detecting ACK and NACK, in the receiver (0-threshold detection).

1. 4. 1 FDD System

Table 6 shows an example of test parameters for PHICH in a FDD system.

TABLE 6

| Parameter | | Unit | Single antenna port | Transmit diversity |
|---|---|---|---|---|
| Downlink power allocation | PCFICH_RA PDCCH_RA PHICH_RA OCNG_RA | dB | 0 | −3 |
| | PCFICH_RB PDCCH_RB PHICH_RB OCNG_RB | dB | 0 | −3 |
| PHICH duration | | | Normal | Normal |
| Number of PHICH groups (Note 1) | | | Ng = 1 | Ng = 1 |
| PDCCH Content | | | UL Grant should be included with the proper information aligned with A.3.6. | |
| Unused RE-s and PRB-s | | | OCNG | OCNG |
| Cell ID | | | 0 | 0 |
| $N_{oc}$ at antenna port | | dBm/15 kHz | −98 | −98 |
| Cyclic prefix | | | Normal | Normal |

(Note 1):
according to Clause 6.9 in TS 36.211 [4]

Referring to FIG. 6, downlink power allocation can be classified into xCH_RA and xCH_RB according to whether a reference signal (RS) is transmitted on a downlink channel and an OFDMA channel noise generator (OCNG) pattern. The xCH_RA indicates xCH energy per resource element (EPRE) to RS EPRE ratio within all OFDM symbols not including the RS for the corresponding channel. The xCH_RB indicates the xCH EPRE to RS EPRE ratio within all OFDM symbols including the RS for the corresponding channel.

$N_{oc}$ indicates power spectral density (average power per resource element (RE) normalized in a subcarrier spacing) of a white noise source measured in an antenna connector of a user equipment and interference is simulated from a cell not defined in a test procedure.

Parameter values specified in Table 6 can be applied to a test of a FDD system described in the following description. The probability (Pm-an) of the miss-detecting, which is calculated in a manner of assuming the parameter values, and a signal to noise ratio (SNR) are shown in Table 7 to Table 9 in the following.

In case that a base station uses a single antenna port for PHICH transmission, Table 7 shows an example of minimum performance of a user equipment required for the PHICH demodulation.

Referring to Table 7 to Table 9, various downlink parameters are configured to determine the minimum performance of the user equipment required for the PHICH demodulation.

A bandwidth indicates a frequency bandwidth of a downlink channel.

In LTE/LTE-A system, reference channels (or reference measurement channels) are classified according to various performance tests. And, the number of transmission antenna ports, a channel bandwidth, resource allocation, power offset and the like are defined for each of the classified reference measurement channels in LTE/LTE-A system. The reference measurement channels for PHICH performance measurement are classified into R.18, R.19, R.20 and R.24.

The OCNG pattern is used for modeling allocation for a virtual UE, which is not used for a performance test, and/or allocation for MBSFN. The OCNG pattern for each subframe specifies OCNG allocation in each subframe and a relative power level in accordance with each OCNG allocation. In LTE/LTE-A system, OCNG FDD/TDD patterns are divided into 1 to 5.

A propagation condition includes a delay profile, a combination of channel model parameters and the like. The delay profile is classified into a low/middle/high delay spread environment according to a size of delay spread in LTE/LTE-A system. In doing so, the delay profile includes an extended

TABLE 7

| Test number | Bandwidth | Reference Channel | OCNG Pattern | Propagation Condition | Antenna configuration and correlation Matrix | Reference value Pm-an (%) | SNR (dB) |
|---|---|---|---|---|---|---|---|
| 1 | 10 MHz | R.18 | OP.1 FDD | ETU70 | 1 × 2 Low | 0.1 | 5.5 |
| 2 | 10 MHz | R.24 | OP.1 FDD | ETU70 | 1 × 2 Low | 0.1 | 0.6 |

In case that the base station uses two antenna ports for PHICH transmission, Table 8 shows an example of minimum performance of the user equipment required for the PHICH demodulation.

pedestrian A (EPA) model, an extended vehicular A (EVA) model and an extended typical urban (ETU) model. And, a combination of channel model parameters is specified by a maximum Doppler frequency. 5 Hz, 70 Hz, 30 Hz and 300 Hz

TABLE 8

| Test number | Bandwidth | Reference Channel | OCNG Pattern | Propagation Condition | Antenna configuration and correlation Matrix | Reference value Pm-an (%) | SNR (dB) |
|---|---|---|---|---|---|---|---|
| 1 | 10 MHz | R.19 | OP.1 FDD | EVA70 | 2 × 2 Low | 0.1 | 4.4 |

In case that the base station uses four antenna ports for PHICH transmission, Table 9 shows an example of minimum performance of the user equipment required for the PHICH demodulation.

are defined as the maximum Doppler frequency in LTE/LTE-A system. In FIG. 7, ETU 70 indicates that the maximum Doppler frequency in the ETU model corresponds to 70 Hz.

TABLE 9

| Test number | Bandwidth | Reference Channel | OCNG Pattern | Propagation Condition | Antenna configuration and correlation Matrix | Reference value Pm-an (%) | SNR (dB) |
|---|---|---|---|---|---|---|---|
| 1 | 5 MHz | R.20 | OP.1 FDD | EPA5 | 4 × 2 Medium | 0.1 | 6.1 |

Antenna configuration indicates a combination of an antenna of a transmitting end and an antenna of a receiving end and a MIMO (multi input multi output) correlation matrix is defined in a manner of being divided into a correlation matrix type including a high level, a middle level and a low level. In FIG. 7, the MIMO correlation matrix includes a correlation matrix type of the low level and the antenna configuration corresponds to a case of 1×2.

In LTE/LTE-A system, a reference value is defined by minimum performance of a user equipment required by a FDD system based on the downlink parameters configured in Table 7 to Table 9. The reference value is defined by the probability (Pm-an) of the miss-detecting and the signal to noise ratio (SNR).

1. 4. 2. TDD System

Table 10 shows an example of test parameters for PHICH in a FDD system.

TABLE 10

| Parameter | | Unit | Single antenna port | Transmit diversity |
|---|---|---|---|---|
| Uplink downlink configuration (Note 1) | | | 1 | 1 |
| Special subframe configuration (Note 2) | | | 4 | 4 |
| Downlink power allocation | PCFICH_RA PDCCH_RA PHICH_RA OCNG_RA | dB | 0 | −3 |
| | PCFICH_RB PDCCH_RB PHICH_RB OCNG_RB | dB | 0 | −3 |
| PHICH duration | | | Normal | Normal |
| Number of PHICH groups (Note 3) | | | Ng = 1 | Ng = 1 |
| PDCCH Content | | | UL Grant should be included with the proper information aligned with A.3.6. | |
| Unused RE-s and PRB-s | | | OCNG | OCNG |
| Cell ID | | | 0 | 0 |

TABLE 10-continued

| Parameter | Unit | Single antenna port | Transmit diversity |
|---|---|---|---|
| $N_{oc}$ at antenna port | dBm/15 kHz | −98 | −98 |
| Cyclic prefix | | Normal | Normal |
| ACK/NACK feedback mode | | Multiplexing | Multiplexing |

(Note 1):
as specified in Table 4.2-2 in TS 36.211 [4]
(Note 2):
as specified in Table 4.2-1 in TS 36.211 [4]
(Note 3):
according to Clause 6.9 in TS 36.211 [4]

Referring to Table 10, assume that uplink downlink configuration corresponds to 1 and special subframe configuration corresponds to 4. And, assume that an ACK/NACK feedback mode corresponds to a multiplexing mode. Since the other parameters are identical to the parameters of the aforementioned FDD system shown in Table 6, explanation on the parameters is omitted.

Parameter values specified in Table 10 can be applied to a test of the FDD system described in the following. The probability (Pm-an) of the miss-detecting, which is calculated in a manner of assuming the parameter values, and a signal to noise ratio (SNR) are shown in Table 11 to Table 13 in the following.

In case that a base station uses a single antenna port for PHICH transmission, Table 11 shows an example of minimum performance of a user equipment required for the PHICH demodulation.

TABLE 11

| Test number | Bandwidth | Reference Channel | OCNG Pattern | Propagation Condition | Antenna configuration and correlation Matrix | Reference value | |
|---|---|---|---|---|---|---|---|
| | | | | | | Pm-an (%) | SNR (dB) |
| 1 | 10 MHz | R.18 | OP.1 TDD | ETU70 | 1 × 2 Low | 0.1 | 5.8 |
| 2 | 10 MHz | R.24 | OP.1 TDD | ETU70 | 1 × 2 Low | 0.1 | 1.3 |

In case that the base station uses two antenna ports for PHICH transmission, Table 12 shows an example of minimum performance of the user equipment required for the PHICH demodulation.

TABLE 12

| Test number | Bandwidth | Reference Channel | OCNG Pattern | Propagation Condition | Antenna configuration and correlation Matrix | Reference value | |
|---|---|---|---|---|---|---|---|
| | | | | | | Pm-an (%) | SNR (dB) |
| 1 | 10 MHz | R.19 | OP.1 TDD | EVA70 | 2 × 2 Low | 0.1 | 4.2 |

In case that the base station uses four antenna ports for PHICH transmission, Table 13 shows an example of minimum performance of the user equipment required for the PHICH demodulation.

TABLE 13

| Test number | Bandwidth | Reference Channel | OCNG Pattern | Propagation Condition | Antenna configuration and correlation Matrix | Reference value Pm-an (%) | SNR (dB) |
|---|---|---|---|---|---|---|---|
| 1 | 5 MHz | R.20 | OP.1 TDD | EPA5 | 4 × 2 Medium | 0.1 | 6.2 |

Since various downlink parameters configured in Table 11 to Table 13 are identical to the parameters configured in the aforementioned FDD system, explanation on the parameters is omitted.

In LTE/LTE-A system, a reference value is defined by minimum performance of a user equipment required by a TDD system based on the downlink parameters configured in Table 11 to Table 13.

1. 4. 3. eICIC (Enhanced Inter-Cell Interference Coordination) Environment

Table 14 shows an example of test parameters for PHICH in eICIC environment.

TABLE 14

| Parameter | | Unit | Cell 1 | Cell 2 |
|---|---|---|---|---|
| Downlink power allocation | PCFICH_RA PDCCH_RA PHICH_RA OCNG_RA | dB | −3 | −3 |
| | PCFICH_RB PDCCH_RB PHICH_RB OCNG_RB | dB | −3 | −3 |
| $\hat{E}_s/N_{oc1}$ (Note 2) | | dB | N/A | 4 |
| $\hat{E}_s/N_{oc2}$ (Note 3) | | dB | N/A | 1.5 |
| $BW_{Channel}$ | | MHz | 10 | 10 |
| Subframe Configuration | | | Non-MBSFN | Non-MBSFN |
| Cell Id | | | 0 | 1 |
| PDCCH Content | | | UL Grant should be included with the proper information aligned with A.3.6. | N/A |
| ABS pattern | | | N/A | 1/8 based and 2/8 based (Note 4) |
| Number of control OFDM symbols | | | 3 | N/A |
| Number of PHICH groups ($N_g$) | | | 1 | N/A |
| PHICH duration | | | extended | N/A |
| Unused RE-s and PRB-s | | | OCNG | N/A |
| Cyclic prefix | | | Normal | N/A |
| Tx EVM | | | 6% | N/A |

TABLE 14-continued

| Parameter | Unit | Cell 1 | Cell 2 |
|---|---|---|---|
| Channels additional delay | us | N/A | 2.5 (Note 5) |

(Note 2):
This noise is applied in OFDM symbols #1, #2, #3, #5, #6, #8, #9, #10, #12, #13 of a subframe overlapping with the aggressor ABS
(Note 3):
This noise is applied in OFDM symbols #0, #4, #7, #11 of a subframe overlapping with the aggressor ABS
(Note 4):
1/8 based ABS pattern: [00000100, 00000100, 00000100, 01000100, 00000100] for FDD. [0000000001, 0000000001] for TDD
2/8 based ABS pattern: [11000100, 11000000, 11000000, 11000000, 11000000] for FDD, [0000010011, 0000000011] for TDD
(Note 5):
Additional delay for cell2 with respect to cell1.

Referring to Table 14, $\hat{E}_s$ indicates energy per resource element (RE), which is received in an antenna connector during a valid part (e.g., except a cyclic prefix) of a symbol which is calculated (divided by the number of RE within allocated resources and average power of RBs normalized to a subcarrier spacing) over the allocated RBs.

$N_{oc1}$ indicates power spectral density (average power per resource element (RE) normalized in a subcarrier spacing) of a white noise source measured in an antenna connector of a user equipment and interference of a non-CRS symbol within an ABS (almost blanked subframe) is simulated from a cell not defined in a test procedure.

$N_{oc2}$ indicates power spectral density (average power per resource element (RE) normalized in a subcarrier spacing) of a white noise source measured in an antenna connector of a user equipment and interference of a CRS symbol within an ABS (almost blanked subframe) is simulated from a cell not defined in a test procedure.

A Tx EVM indicates a Tx error vector magnitude. An error vector (EV) is measured by a difference between a reference waveform and a measured waveform.

Parameter values specified in Table 14 can be applied to a test in eICIC environment described in the following. The probability (Pm-an) of the miss-detecting, which is calculated in a manner of assuming the parameter values, and a signal to noise ratio (SNR) are shown in Table 15 in the following.

In case that a base station uses two antenna ports for PHICH transmission, Table 15 shows an example of minimum performance of a user equipment required for the PHICH demodulation.

TABLE 15

| Test Number | Reference Channel | OCNG Pattern | Propagation Conditions Cell 1 | Propagation Conditions Cell 2 | Antenna Configuration and Correlation Matrix | Reference Value Pm-an (%) | Reference Value SNR (dB) |
|---|---|---|---|---|---|---|---|
| 1 | R.19 | OP.1 FDD | EPA5 | EPA5 | 2 × 2 Low | 0.1 | TBD |

Since various parameters configured in Table 15 are identical to the parameters of the aforementioned FDD system, explanation on the parameters is omitted.

In LTE/LTE-A system, a reference value is defined by minimum performance of a user equipment required in the eICIC environment based on the downlink parameters configured in Table 15.

2. Method of Detecting PHICH

Discussion on PHICH demodulation performance standard in eICIC environment is actively progressing in LTS-A Rel-10 system and an assumption for the PHICH performance standard is mentioned earlier in 1. 3.

Figure 9:
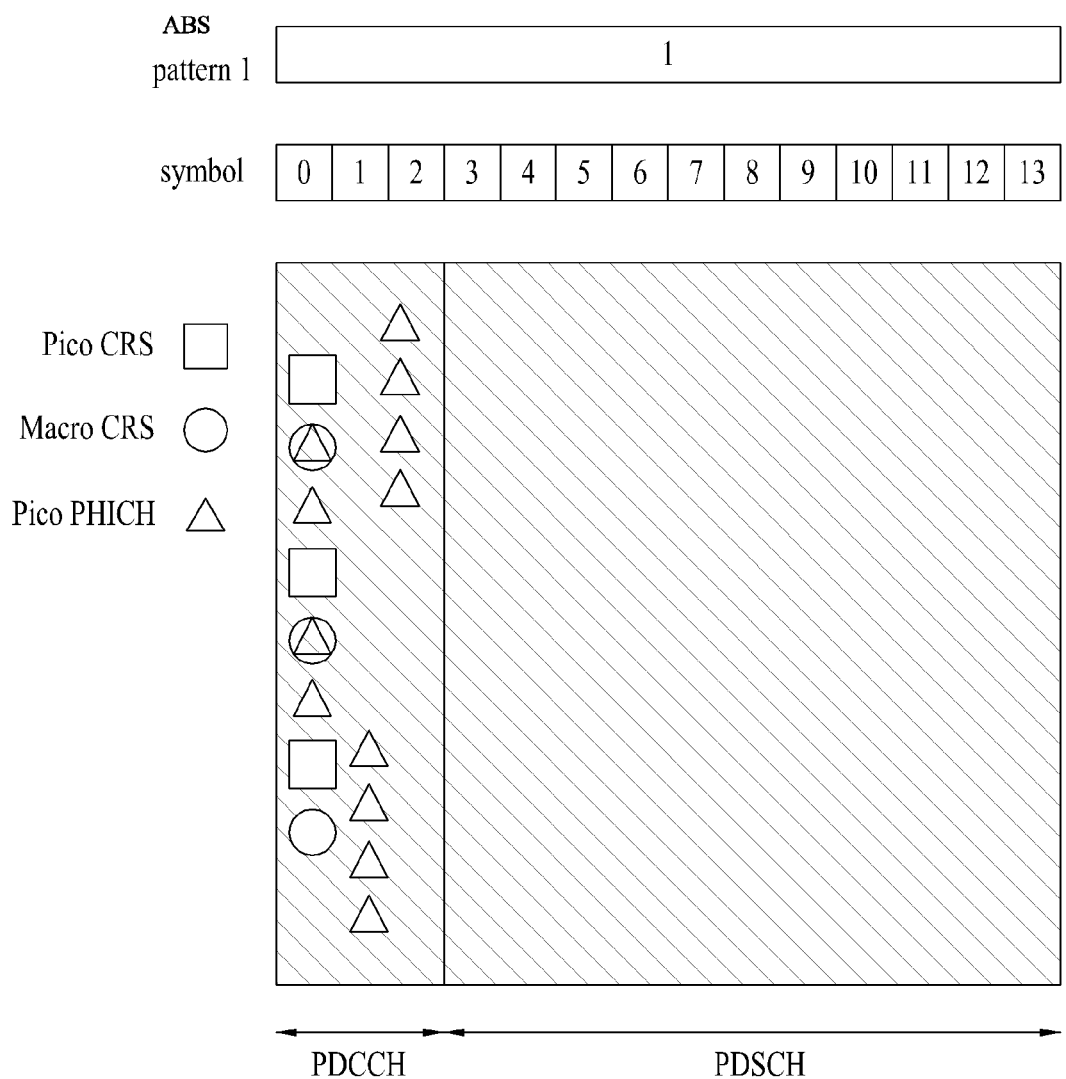
FIG. 9 is a diagram for an example of a PHICH existing in many symbols in eICIC environment according to one embodiment of the present invention.

FIG. 9 is a diagram for an example of a PHICH existing in many symbols in eICIC environment according to one embodiment of the present invention.

In FIG. 9, assume that a user equipment receives a service from a pico cell (pico base station) and a macro cell (macro base station) corresponds to a cell causing interference. And, assume that the macro cell transmits an ABS subframe (ABS pattern=1). And, assume a case of a non-colliding CRS that there is no colliding CRS between a CRS of the macro cell and a CRS of the pico cell. This may correspond to (b) and (d) among the 4 cases mentioned earlier in FIG. 6.

In FIG. 9, a box represented by numbers from 0 to 13 indicates indexes of an OFDM symbol in time domain on a resource grid.

Referring to FIG. 9, as mentioned in the foregoing description, the macro cell (or a neighboring interfering cell) does not transmit any downlink control channel and data channel in an ABS subframe except a CRS in an environment supporting eICIC and the CRS is transmitted in $0^{th}$, $4^{th}$, $7^{th}$ and $11^{th}$ OFDM symbol. And, if PHICH duration of the pico cell is extended, in particular, if PHICH is transmitted in many OFDM symbols, the PHICH transmitted in $0^{th}$ OFDM symbol can be transmitted together with a CRS of the macro cell in an identical time-frequency position. FIG. 9 shows an example that PHICH symbol (2 PHICH symbols) transmitted in the $0^{th}$ OFDM symbol collide with the CRS of the macro cell.

A user equipment can perform the process mentioned earlier in FIG. 7 in an opposite direction to check ACK/NACK information in PHICH received from a base station. The user equipment identifies a PHICH resource which is allocated to the user equipment by an index pair ($n_{PHICH}^{group}$, $n_{PHICH}^{seq}$) and generates a PHICH modulation symbol in a manner of de-spreading a signal received via the PHICH resource using an orthogonal sequence (e.g., Hadamard matrix) shown in Table 4. Subsequently, if a position of the PHICH modulation symbol, which is generated by de-spreading, in terms of property corresponds to −1, the user equipment demodulates the position to 0. If the position corresponds to 1, the user equipment can demodulate the position to 1. By doing so, the user equipment can restore an HI code word. And, referring to Table 13 again, if the HI code word received by the user equipment corresponds to <1, 1, 1>, the user equipment can generate HI=1 by decoding the <1, 1, 1>. If the HI code word received by the user equipment corresponds to <0, 0, 0>, the user equipment can generate HI=0 by decoding the <0, 0, 0>.

In this case, the user equipment can detect ACK/NACK of PHICH in a manner of obtaining an average of all PHICH modulation symbols. In particular, the user equipment adds up all modulation symbols and obtains an average of the modulation symbols. BY doing so, the user equipment can check the ACK/NACK.

Yet, since interference of a neighboring cell influencing a $1^{st}$, a $2^{nd}$ and $3^{rd}$ OFDM symbol where PHICH can exist is very small, ACK/NACK detection accuracy of PHICH may increase. On the contrary, due to the interference of the neighboring cell, the ACK/NACK detection accuracy of an actual PHICH may be lowered in a $0^{th}$ OFDM symbol. In other word, accuracy of the ACK/NACK detection for a PHICH symbol transmitted in the $0^{th}$ OFDM symbol may be lower than the detection accuracy for the ACK/NACK of PHICH of the pico cell transmitted in the $1^{st}$ and the $2^{nd}$ OFDM symbol due to the interference from the CRS of the macro cell. In particular, when the PHICH is transmitted via many OFDM symbols in the eICIC environment, the detection accuracy of the actual PHICH may vary according to a position of the OFDM symbol that is transmitted. Consequently, if the ACK/NACK of PHICH is detected in a manner of adding up all PHICH symbols transmitted in the 0th, $1^{st}$ and $2^{nd}$ OFDM symbols, a total ACK/NACK detection accuracy of the PHICH may be lowered due to the PHICH symbol colliding with the CRS of the macro cell.

In order to solve the aforementioned problem, the present invention proposes a method of enhancing the ACK/NACK detection accuracy of the PHICH in an environment that supports the eICIC.

Figure 10:
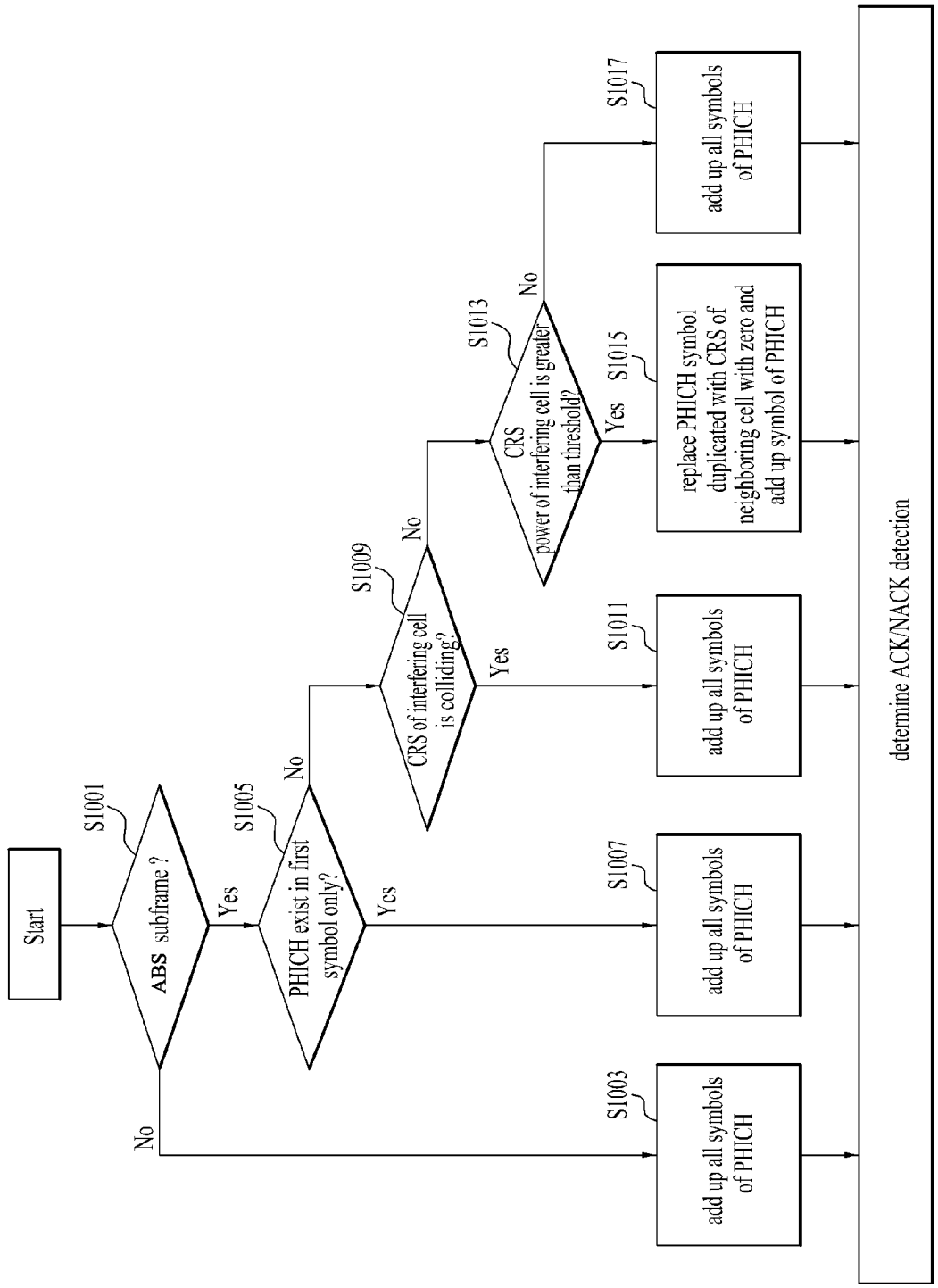
FIG. 10 is a flowchart for a method of detecting a PHICH according to one embodiment of the present invention.

FIG. 10 is a flowchart for a method of detecting a PHICH according to one embodiment of the present invention.

Referring to FIG. 10, a user equipment determines whether a subframe transmitted by an interfering cell corresponds to an ABS subframe in order to check whether eICIC is applied [S1001]. In this case, the interfering cell may include one or more interfering cells. If there exist a plurality of the interfering cells, the user equipment determines whether all subframes transmitted by a plurality of the interfering cells correspond to the ABS subframe. The interfering cell (an aggressor cell or a primary cell) indicates a cell causing interference. Examples of the interfering cell may include a neighboring cell, a macro cell, a pico cell and the like.

In the step S1001, if the subframe transmitted by the interfering cell does not correspond to the ABS subframe, the user equipment adds up all PHICH symbols and determines ACK/NACK detection [S1003]. If the subframe transmitted by the interfering cell does not correspond to the ABS subframe, since control signals (PCFICH, PDCCH, PHICH and the like) of the interfering cell are transmitted as well as a CRS, interference of the interfering cell may influence on PHICH symbols as well as a PHICH symbol transmitted in a $0^{th}$ OFDM symbol among the PHICHs transmitted in a serving cell. Hence, PHICH ACK/NACK detection is determined in a manner of adding up all 12 PHICH symbols. In particular, after de-spreading the 12 PHICH symbols, the ACK/NACK of the PHICH is checked in a manner of adding up all 3 PHICH modulation symbols.

On the contrary, in the step S1001, if the subframe transmitted by the interfering cell corresponds to the ABS subframe, the user equipment determines whether the PHICH transmitted by the serving cell exists in the first OFDM symbol ($0^{th}$ OFDM symbol) only [S1005]. In this case, the subframe transmitted by the interfering cell may correspond to a normal subframe or an MBSFN subframe.

In the step S1005, if the PHICH transmitted by the serving cell exists in the first OFDM symbol ($0^{th}$ OFDM symbol) only, the user equipment determines the ACK/NACK detection in a manner of adding up all PHICH symbols [S1007]. If the PHICH is transmitted in the $0^{th}$ OFDM symbol only, there may exist possibility that all PHICH symbols transmitted in the $0^{th}$ OFDM symbol are interfered by the CRS of the interfering cell. Hence, the user equipment determines the PHICH ACK/NACK detection in a manner of adding up all 12 PHICH symbols. In particular, after de-spreading the 12 PHICH symbols, the user equipment checks the ACK/NACK of the PHICH in a manner of adding up all 3 PHICH modulation symbols.

On the contrary, in the step S1005, if the PHICH transmitted by the serving cell does not exist in the first OFDM symbol ($0^{th}$ OFDM symbol) only, in particular, if the PHICH exists in a plurality of OFDM symbols ($0^{th}$ and $1^{st}$ OFDM symbol or $0^{th}$, $1^{st}$ and $2^{nd}$ OFDM symbol), the user equipment determines whether the CRS of the interfering cell collides with the CRS of the serving cell [S1009].

In the step S1009, if the CRS of the interfering cell collides with the CRS of the serving cell, the user equipment determines the ACK/NACK detection in a manner of adding up all PHICH symbols [S1011]. In particular, after de-spreading the 12 PHICH symbols, the user equipment checks the ACK/NACK of the PHICH in a manner of adding up all 3 PHICH modulation symbols. Since the CRS of the pico cell and the PHICH are transmitted from positions different from each other, if the CRS of the pico cell collides with the CRS of the interfering cell, it consequently means that the PHICH of the pico cell does not collide with the CRS of the interfering cell. Hence, all of OFDM symbols in which the PHICH of the pico cell exists have a very small interference of the neighboring cell and the ACK/NACK detection accuracy of the PHICH may become enhanced.

On the contrary, in the step S1009, if the CRS of the interfering cell does not collide with the CRS of the serving cell, the user equipment determines whether CRS power of the interfering cell is greater than a predetermined threshold [S1013]. This means to determine whether a diversity gain for PHICH transmission is beneficial for the accuracy of the PHICH detection or replacement (or puncturing) of an interfered PHICH symbol with 0 value. For instance, when the PHICH symbol is transmitted in 2 OFDM symbols only, if the PHICH symbol transmitted in $0^{th}$ OFDM symbol is replaced (punctured) with the 0 value, the diversity gain may be reduced. In this case, the threshold value can be determined using a difference value between transmission/reception power of the CRS of the serving cell and transmission/reception power of the CRS of the interfering cell. As an example, the threshold value can be determined by −6 dB. In particular, the user equipment can determine whether the CRS transmission/reception power of the interfering cell is greater than −6 dB (0.25 times) in a manner of comparing the CRS transmission/reception power of the serving cell with the CRS transmission/reception power of the interfering cell.

In the step S1013, if the CRS power of the interfering cell is greater than the predetermined threshold, the user equipment determines the ACK/NACK detection in a manner of replacing (puncturing) a PHICH symbol, which is transmitted in an OFDM symbol position duplicated with the CRS of the interfering cell, with 0 (zero) and then adding up the PHICH symbol [S1015]. In particular, after de-spreading 12 PHICH symbols, the user equipment checks the ACK/NACK of the PHICH in a manner of replacing the PHICH symbol transmitted in the $0^{th}$ OFDM symbol with 0 and then adding up all 3 PHICH modulation symbols. For instance, referring to FIG. 9 again, the user equipments replaces (punctures) the PHICH symbol transmitted in the $0^{th}$ OFDM symbol with 0 and can determine the PHICH ACK/NACK detection for 8 PHICH symbols positioned at the $1^{st}$ and the $2^{nd}$ OFDM symbols.

On the contrary, in the step S1013, if the CRS power of the interfering cell is less than the threshold, the user equipment determines the ACK/NACK detection in a manner of adding up all PHICH symbols [S1017]. In particular, after de-spreading 12 PHICH symbols, the user equipment can check the ACK/NACK of the PHICH in a manner of adding up all 3 PHICH modulation symbols.

Meanwhile, although it is not depicted in FIG. 10, if an average (summation) of all PHICH modulation symbols is greater than 0, the user equipment can successfully perform the ACK/NACK detection. Yet, if the average is equal to 0 or less than 0, the user equipment fails to detect the ACK/NACK. In this case, if the PHICH ACK/NACK is detected in a manner of preferentially applying the PHICH symbol transmitted in an OFDM symbol position ($1^{st}$ OFDM symbol or $1^{st}$ and $2^{nd}$ OFDM symbol), which is not duplicated with the CRS of the interfering cell, in the step S1013, a procedure may end. Yet, if the PHICH ACK/NACK is not detected, the PHICH ACK/NACK can be detected in a manner of considering all PHICH symbols including the PHICH symbol located at the $0^{th}$ OFDM symbol position. In particular, after de-spreading 12 PHICH symbols, the user equipment can check the ACK/NACK of the PHICH in a manner of adding up all 3 PHICH modulation symbols.

Figure 11:
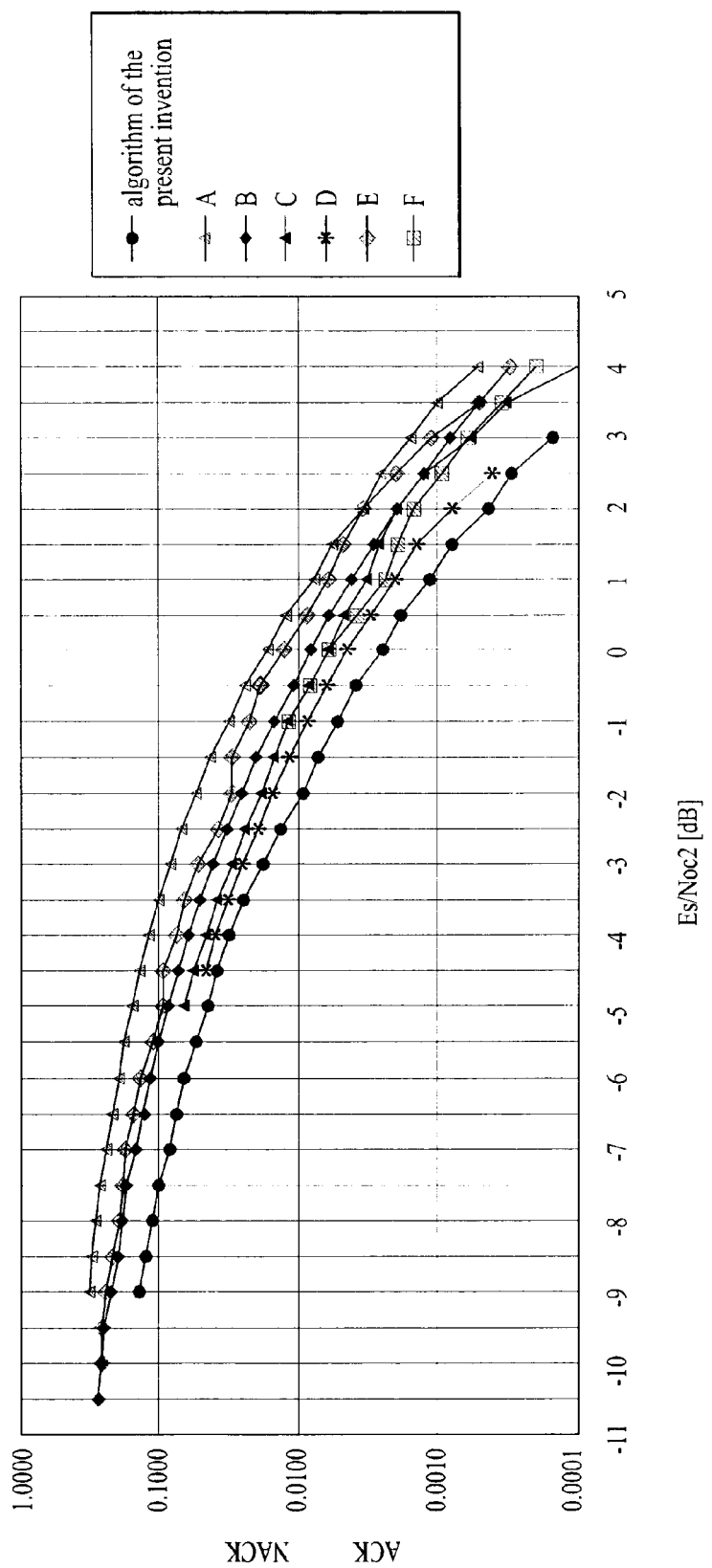
FIG. 11 is a diagram for an example of a result graph resulted from simulating PHICH detection performance of a user equipment in a manner of applying a method according to the present invention.

FIG. 11 is a diagram for an example of a result graph resulted from simulating PHICH detection performance of a user equipment in a manner of applying a method according to the present invention.

Referring to FIG. 11, a vertical axis indicates the Pm-an (%) shown in Table 15 and a horizontal axis indicates the SNR (dB).

As shown in Table 15, since LTE-A system requires 0.1 as a value of the Pm-an (%), when simulation results are examined on the basis of 0.0010 in the graph, it is able to know that a result simulated by applying the present invention is enhanced as much as 2 dB compared to a result simulated by applying different algorithms.

4. The Generals of Device Applicable to the Present Invention

Figure 12:
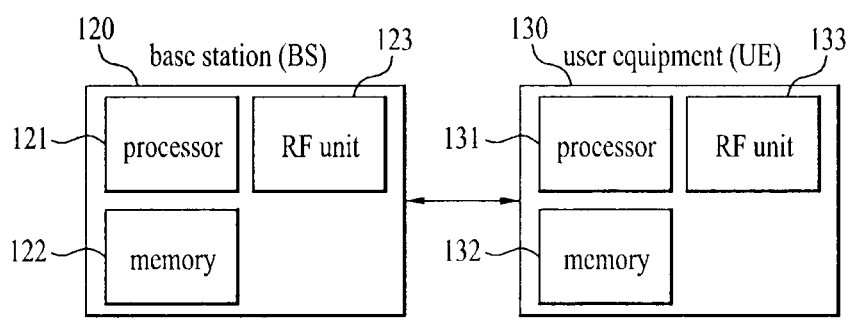
FIG. 12 is a block diagram for a wireless communication device according to one embodiment of the present invention.

FIG. 12 is a block diagram for a wireless communication device according to one embodiment of the present invention.

Referring to FIG. 12, a wireless communication system includes a base station 120 and a plurality of user equipments positioned within a region of the base station 120.

The base station 120 includes a processor 121, a memory 122 and a radio frequency (RF) unit 123. The processor 121 implements a proposed function, a procedure and/or a method. Layers of a wireless interface protocol can be implemented by the processor 121. The memory 122 is connected with the processor 121 and store various information necessary for driving the processor 121. The RF unit 123 is connected with the processor 121 and transmits and/or receives a radio signal.

A user equipment includes a processor 131, a memory 132 and a radio frequency (RF) unit 133. The processor 131 implements a proposed function, a procedure and/or a method. Layers of a wireless interface protocol can be implemented by the processor 131. The memory 132 is connected with the processor 131 and store various information necessary for driving the processor 131. The RF unit 133 is connected with the processor 131 and transmits and/or receives a radio signal.

The memory 122/132 may be installed inside or outside of the processor 121/131 and can be connected with the processor 121/131 with well-known means. And, the base station 120 and/or the user equipment 130 may have a single antenna or multiple antennas.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although various embodiments according to the present invention are explained centering on an example applied to 3GPP LTE system, the present invention can be identically applied to various wireless access systems as well as 3GPP LTE system.

What is claimed is:

1. A method for detecting a PHICH (physical hybrid-ARQ indicator channel) of a serving base station in a wireless access system supporting eICIC (enhanced inter-cell interference coordination), the method comprising:

when a subframe transmitted by a neighboring base station corresponds to an ABS (almost blanked subframe), determining whether the PHICH exists in a 0th OFDM (orthogonal frequency division multiplexing) symbol only;

when the PHICH does not exist in the 0th OFDM symbol only, determining whether a CRS (common reference signal) of the neighboring base station collides with a CRS of the serving base station;

when the CRS of the neighboring base station does not collide with the CRS of the serving base station, determining whether CRS power of the neighboring base station is greater than a predetermined threshold; and when the CRS power of the neighboring base station is greater than the predetermined threshold, determining ACK/NACK (acknowledgement/negative-ACK) detection in a manner of replacing symbols of the PHICH duplicated with the CRS of the neighboring base station with 0 and then adding up the symbols of the PHICH.

2. The method of claim 1, further comprising:

when the PHICH exists in the 0th OFDM symbol only, determining the ACK/NACK detection in a manner of adding up all of the symbols of the PHICH.

3. The method of claim 1, further comprising:

when the CRS of the neighboring base station collides with the CRS of the serving base station, determining the ACK/NACK detection in a manner of adding up all of the symbols of the PHICH.

4. The method of claim 1, further comprising:

when the CRS power of the neighboring base station is not greater than the predetermined threshold, determining the ACK/NACK detection in a manner of adding up all of the symbols of the PHICH.

5. The method of claim 1, wherein the threshold is determined based on a relative value of the CRS power of the neighboring base station and the CRS power of the serving base station.

6. The method of claim 1, wherein the subframe transmitted by the neighboring base station corresponds to an MBSFN (multicast broadcast single frequency network) subframe.

7. A user equipment detecting a PHICH (physical hybrid-ARQ indicator channel) of a serving base station in a wireless access system supporting eICIC (enhanced inter-cell interference coordination), the user equipment comprising:

an RF (radio frequency) unit configured to transmit and receive a radio signal; and a processor which is configured to:

when a subframe transmitted by a neighboring base station corresponds to an ABS (almost blanked subframe), determine whether the PHICH exists in a 0th OFDM (orthogonal frequency division multiplexing) symbol only;

when the PHICH does not exist in the 0th OFDM symbol only, determine whether a CRS (common reference signal) of the neighboring base station collides with a CRS of the serving base station;

when the CRS of the neighboring base station does not collide with the CRS of the serving base station, determine whether CRS power of the neighboring base station is greater than a predetermined threshold, when the CRS power of the neighboring base station is greater than the predetermined threshold, determine ACK/NACK (acknowledgement/negative-ACK) detection in a manner of replacing symbols of the PHICH duplicated with the CRS of the neighboring base station with 0 and then adding up the symbols of the PHICH.

8. The user equipment of claim 7, wherein when the PHICH exists in the 0th OFDM symbol only, the processor is configured to determine the ACK/NACK detection in a manner of adding up all of the symbols of the PHICH.

9. The user equipment of claim 7, wherein when the CRS of the neighboring base station collides with the CRS of the serving base station, the processor is configured to determine the ACK/NACK detection in a manner of adding up all of the symbols of the PHICH.

10. The user equipment of claim 7, wherein when the CRS power of the neighboring base station is not greater than the predetermined threshold, the processor is configured to determine the ACK/NACK detection in a manner of adding up all of the symbols of the PHICH.

11. The user equipment of claim 7, wherein the threshold is determined based on a relative value of the CRS power of the neighboring base station and the CRS power of the serving base station.

12. The user equipment of claim 7, wherein the subframe transmitted by the neighboring base station corresponds to an MBSFN (multicast broadcast single frequency network) subframe.

* * * * *